United States Patent
Kim et al.

(10) Patent No.: US 9,400,913 B2
(45) Date of Patent: Jul. 26, 2016

(54) OPTICAL FINGERPRINT RECOGNITION APPARATUS

(71) Applicant: SUPREMA INC., Seongnam-si (KR)

(72) Inventors: SungHa Kim, Seongnam-si (KR); Jae Hyeon Park, Seongnam-si (KR); BoGun Park, Seongnam-si (KR); Bong Seop Song, Seongnam-si (KR); Jae Won Lee, Seongnam-si (KR)

(73) Assignee: SUPREMA INC., Gyeonggi-Do (KR)

( * ) Notice: Subject to any disclaimer, the term of this patent is extended or adjusted under 35 U.S.C. 154(b) by 254 days.

(21) Appl. No.: 14/139,870

(22) Filed: Dec. 24, 2013

(65) Prior Publication Data

US 2015/0022648 A1    Jan. 22, 2015

(30) Foreign Application Priority Data

Jul. 19, 2013    (KR) .................. 10-2013-0085129

(51) Int. Cl.
*G06K 9/00*    (2006.01)

(52) U.S. Cl.
CPC ................................ *G06K 9/00046* (2013.01)

(58) Field of Classification Search
CPC ................................................. G06K 9/00046
See application file for complete search history.

(56) References Cited

U.S. PATENT DOCUMENTS

| 6,643,390 | B1 | 11/2003 | Clark et al. |
| 6,956,608 | B1 | 10/2005 | Shapiro et al. |
| 2001/0005004 | A1 | 6/2001 | Shiratsuki et al. |
| 2003/0012416 | A1* | 1/2003 | Ryabov ............. G06K 9/00046 382/124 |
| 2012/0147168 | A1* | 6/2012 | Shin ........................ G02B 5/04 348/77 |

FOREIGN PATENT DOCUMENTS

| JP | 2001-153630 | | 6/2001 | |
| JP | 2001153630 | * | 6/2001 | ............. G01B 11/24 |
| KP | 102000063878 | * | 8/2002 | ............. G06K 9/00 |
| KP | 1020020078004 | * | 4/2003 | ............. G06K 9/00 |
| KR | 2000-0063878 | | 11/2000 | |
| KR | 2002-0078004 | | 10/2002 | |
| KR | 10-2004-0039855 A | | 5/2004 | |

OTHER PUBLICATIONS

Office Action dated Apr. 18, 2014 for corresponding Korean Patent Application No. 10-2013-0085129 and its English summary provided by Applicant's foreign counsel.

* cited by examiner

*Primary Examiner* — Mohammed Rahaman
(74) *Attorney, Agent, or Firm* — Ladas & Parry LLP

(57) ABSTRACT

In accordance with an embodiment, the prism is made slimly to correct the distortion of the fingerprint image such as trapezoidal distortion or the like. Therefore, it is possible to manufacture the optical fingerprint recognition apparatus of a compact size. Further, the imaging lens is arranged to have a de-centering amount and/or a tilt angle with respect to the optical axis, which leads to an effect to implement resolution approaching the diffraction limit.

9 Claims, 15 Drawing Sheets

OPTICAL FINGERPRINT RECOGNITION APPARATUS

RELATED APPLICATIONS

This application claims the benefit of Korean Patent Application No. 10-2013-0085129, filed on Jul. 19, 2013, which is hereby incorporated by reference as if fully set forth herein.

FIELD OF THE INVENTION

The present invention relates to an optical fingerprint recognition apparatus. More particularly, the present invention relates to an optical fingerprint recognition apparatus that is manufactured in compact and slim.

BACKGROUND OF THE INVENTION

Typically, fingerprints have a number of features including ridges, valleys, and finer points. A finer point includes a bifurcation where a ridge is branched and an end point where the ridge ends. The fingerprint can be regarded as a unique biometric data since its characteristic distribution is different every person and two people cannot have the same fingerprints. Thus, the use of biometric data such as fingerprints in a security system may ensure efficient and accurate protection for the district that requires security, movable assets or the like.

A fingerprint recognition apparatus for acquiring an image of the fingerprint may be classified into a semiconductor type apparatus and optical type apparatus, and an optical fingerprint recognition apparatus is widely used rather than a semiconductor fingerprint recognition apparatus. The optical fingerprint recognition apparatus includes a total internal reflection prism glass in which light proceeds through the incident surface of the prism, is reflected at the contact surface of the prism, and is emitted from the exit surface of the prism. When a finger is put on the contact surface of the prism, light undergoes diffused reflectance at the points where the ridges of the fingerprint are in contact with the glass. However, no light undergoes the diffused reflectance at the points where the valleys of the fingerprint are in contact with the glass. Thus, the light emitted from the exit surface of the prism exhibits the characteristics of the fingerprint.

The optical fingerprint recognition apparatus as described above has a merit of an excellent durability, but it has a demerit that a light source, a prism, a lens, and a sensor are arranged in certain distances and angles apart from each other, which renders it thick as compared with the semiconductor type apparatus and makes it hard to reduce the thickness.

Meanwhile, the research for the prisms used for optical fingerprint recognition apparatus has been continued so as to correct the distortion of a fingerprint image as well as to form and emit the fingerprint image. In the prism of the optical fingerprint recognition apparatus, because the distance between the image sensor and a fingerprint, i.e., an optical path is changed depending on the position of the fingerprint, the fingerprint image is distortedly imaged relative to a real image at the point where the fingerprint image is finally formed. In particular, trapezoidal distortions frequently occur.

In order for reducing the distortion of the image, a conventional optical fingerprint recognition apparatus combines a condensing lens for condensing the fingerprint image emitted from a prism with a separate correcting lens or a correcting prism, thereby correcting the distortion and aberration of the fingerprint image.

In this case, however, the conventional optical fingerprint recognition apparatus has the problem that an optical system increases in its volume. That is to say, such a conventional optical fingerprint recognition apparatus is unable to reduce its volume because a condensing lens, an image correction prism, and an optical path changing mirror are discretely installed, which additionally incurs a problem of a decreased productivity and an increased manufacturing cost.

SUMMARY OF THE INVENTION

In view of the above, the present invention provides an optical fingerprint recognition apparatus having a prism that is designed slimly and is capable of correcting the distortion of a fingerprint image such as trapezoidal distortion or the like.

In accordance with an embodiment of the present invention, there is provided an optical fingerprint recognition apparatus includes: a prism configured to emit, through a condensing path, light that is incident from an external light source which is located at the bottom of the exterior of the prism; a mirror unit configured to reflect the light that is emitted from the prism to an image forming path; an imaging lens assembly configured to image the light reflected to the image forming path; and a sensor assembly configured to convert a fingerprint image formed by the image formation into an electrical signal, wherein the prism comprises: an upper surface configured to cause the light from the light source to undergo diffuse reflectance by an object that comes in contact with the upper surface; a lower surface configured to totally reflect the light incident thereon, which undergoes the diffuse reflectance by the upper surface; a first side surface configured to reflect the light incident thereon, which is totally reflected from the lower surface, to the condensing path; a second side surface having a lens configured to condense the light incident thereon, which is reflected from the first side surface through the condensing path, to direct the light to the mirror unit.

Further, the imaging lens assembly comprises an imaging lens arranged on the image forming path, and the imaging lens is arranged to have a de-centering amount with respect to the optical axis.

Further, the imaging lens assembly comprises an imaging lens arranged on the image forming path, and the imaging lens is arranged to have a tilt angle with respect to a perpendicular axis of an optical axis.

Further, the imaging lens comprises a convex lens and a concave lens that are arranged to have tilt angles different from each other.

Further, the light incident on the lower surface has an incident angle that meets the condition for the total reflection.

Further, the first side surface of the prism has a spherical shape.

Further, the first side surface of the prism has an inclined surface, the inclined surface having an angle such that the light incident on the first side surface, which is reflected from the lower surface, is reflected to the condensing path.

Further, the second side surface has an absorbing file formed thereon, the absorbing film serving to prevent diffused reflection by absorbing the light.

Further, the second side surface has a chamfered edge and is covered with the absorbing film in an area excepting the lens.

In accordance with an embodiment of the present invention, the prism is made slimly to correct the distortion of the fingerprint image such as trapezoidal distortion or the like. Therefore, it is possible to manufacture the optical fingerprint recognition apparatus of a compact size.

Further, the imaging lens is arranged to have a de-centering amount and/or a tilt angle with respect to the optical axis, which leads to an effect to implement resolution approaching the diffraction limit.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Embodiments of the present invention will be described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Figure 1:
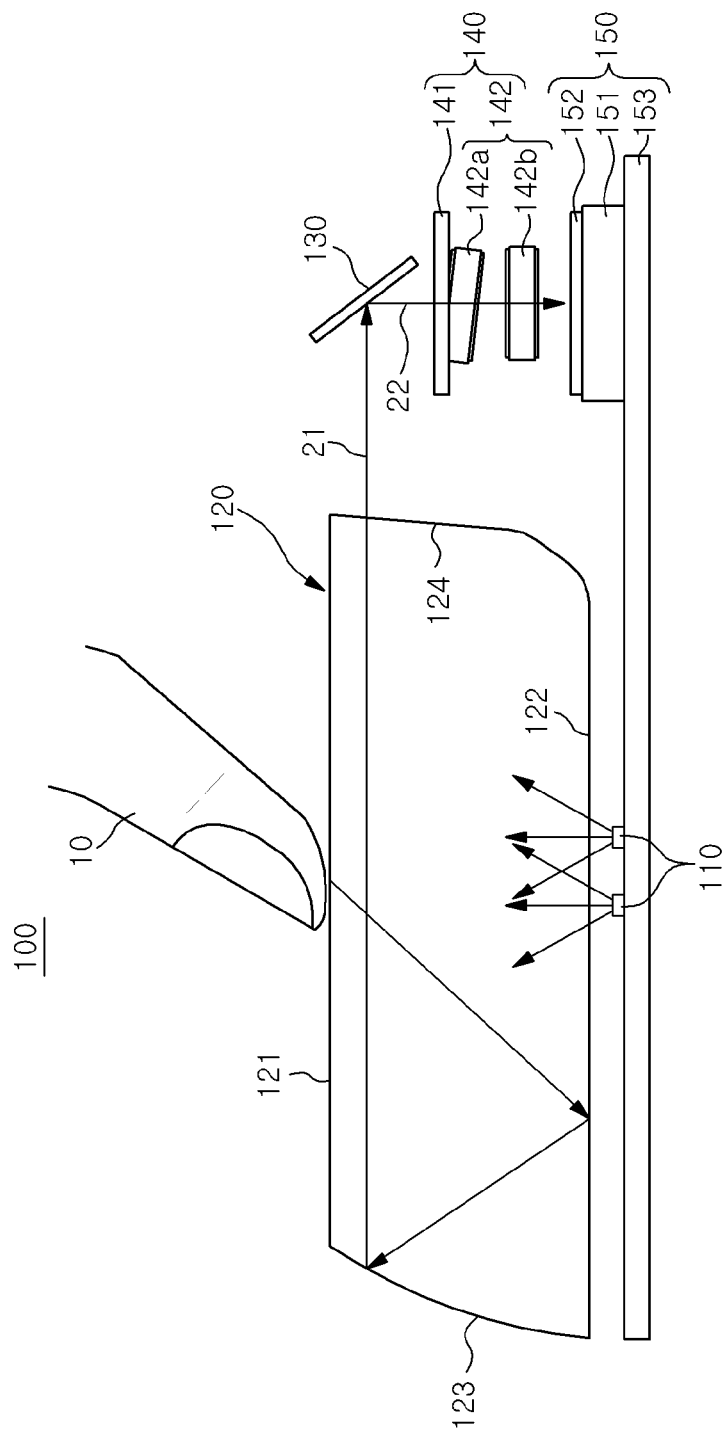
FIG. 1 is a side view of an optical fingerprint recognition apparatus in accordance with an embodiment of the present invention.
Figure 2:
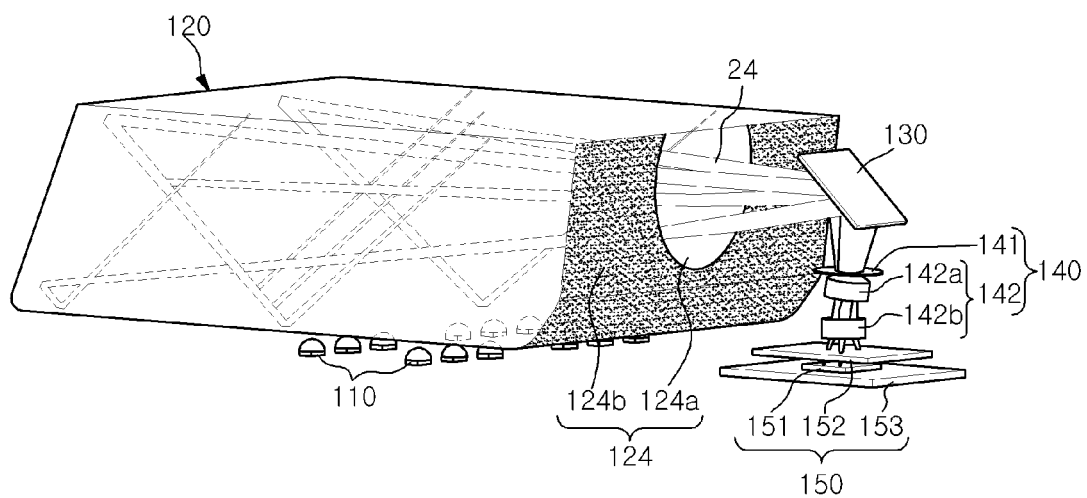
FIG. 2 is a perspective view of an optical fingerprint recognition apparatus in accordance with an embodiment of the present invention.
Figure 3:
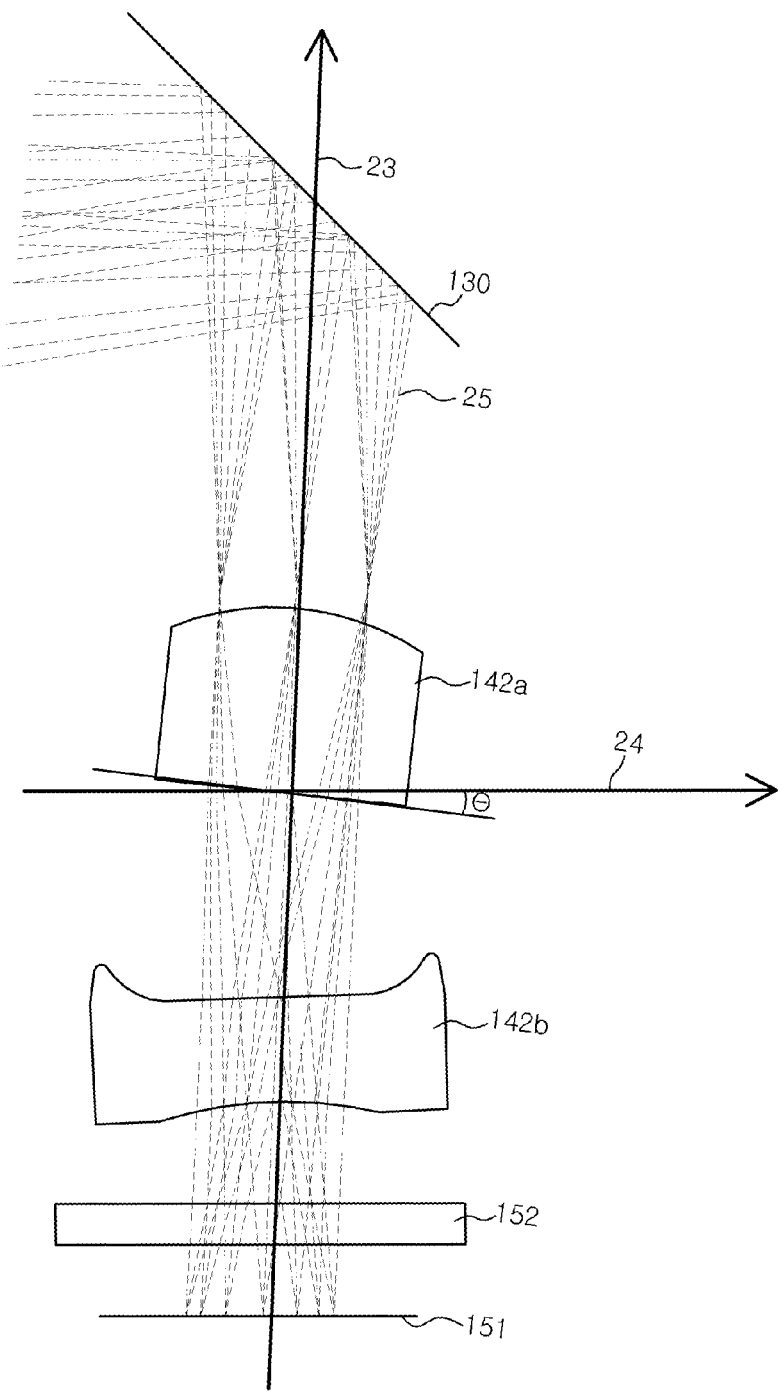
FIG. 3 is an enlarged view of the arrangement of the optical system shown in FIGS. 1 and 2.

FIG. 1 is a side view of an optical fingerprint recognition apparatus in accordance with an embodiment of the present invention; FIG. 2 is a perspective view of an optical fingerprint recognition apparatus in accordance with an embodiment of the present invention; and FIG. 3 is an enlarged view of the arrangement of the optical system shown in FIGS. 1 and 2.

The configuration of an optical fingerprint recognition apparatus 100 in accordance with an embodiment of the present invention will be described with reference to FIGS. 1 to 3.

The optical fingerprint recognition apparatus 100 includes a prism 120 through which light that is incident from a light source 110 is emitted via a condensing path 21, a mirror unit 130 for reflecting the light emitted from the prism 120 to an image forming path 22, an imaging lens assembly 140 for imaging the light reflected to the image forming path 22 thereon, and a sensor assembly 150 for converting a fingerprint image derived from the image formation into an electronic signal.

The light source 110 may include a plurality of optical elements that are arranged at regular intervals in order to direct light having a uniform brightness distribution to the prism 120 and a fingerprint input area on an upper surface 121 of the prism. For example, the light source 110 may include a plurality of LEDs (Light Emitting Diodes) that are arranged to be spaced by a predetermined distance from each other.

The prism 120 includes an upper surface 121 that causes the light incident from the light source 110 which is located at the bottom of the exterior of the prism to undergo diffuse reflectance by a subject which comes in contact with the fingerprint input area of the prism, a lower surface from which the light that is incident after undergoing the diffuse reflectance from the upper surface 121 is totally reflected, a first side surface 123 to reflect the light that is incident after being totally reflected from the lower surface 122 toward the condensing path 21, and a second side surface 124 having a lens 124a to condense the light that is incident via the condensing path 21 after being reflected from the first side surface 123 and direct it to the mirror unit 130.

According to the embodiment, the light that is incident on the lower surface 122 after undergoes the diffuse reflectance from the upper surface 121 of the prism 120 is incident in an incident angle that meets the condition for the total reflectance. To do it, the prism 120 is designed to have the incident angle of 50° or more, thereby reducing the thickness or volume of the prism 120, i.e., making the prism slim. As such, it is possible to make the optical fingerprint recognition apparatus 100 compact by making the upper surface 121 of the prism 120 with which the object comes in contact and the lower surface 122 which causes the total reflection be faced with each other in parallel.

The first side surface 123 has a spherical shape and is inclined at a certain angle such that the light that is incident thereon is reflected to the condensing path 21. Of course, the first side surface 123 of the prism 120 may not be a spherical shape but be an aspherical shape such as a straight line surface or the like. However, the first side surface 123 of the spherical surface may realize low distortion in the prism 120.

The second side surface 124 of the prism 120 has an inclined region that is formed by chamfering at its one side. Also, the second side surface 124 is covered with an absorbing film excepting an area where a lens 124a is formed to prevent diffused reflection by absorbing the light.

The imaging lens assembly 140 includes a stop 141 and an imaging lens 142 that are arranged on the image forming path 22. The imaging lens 142 includes a convex lens 142a and concave lens 142b. The stop 141 serves to block the flow of light that is dispersed, i.e., unwanted light.

The convex lens 142a and the concave lens 142b are arranged to have a de-centering amount with respect to the optical axis 23. FIG. 1 shows a state that the center of the convex lens 142a and the concave lens 142b is not aligned with the optical axis 23, but is biased slightly to the left. For example, the convex lens 142a and the concave lens 142b may be arranged to have a value of the de-centering amount between −0.1 mm and +0.1 mm.

In addition, the convex lens 142a and the concave lens 142b are arranged to have different tilt angles θ relative to a perpendicular axis 24 of the optical axis 23. For example, the tilt angle of the convex lens 142a may have a value between −10° and +10°, and the tilt angle of the concave lens 142b may have a value between −5° and +5°.

As such, the convex lens 142a and the concave lens 142b having the de-centering amount and the tilt angle may contribute to the realization of resolution close to the diffraction limit and low distortion.

The sensor assembly 150 includes a sensor 151 to convert the fingerprint image into an electrical signal, a cover glass 152 to protect the sensor 151, and a substrate 153 to support the sensor 151.

The optical fingerprint recognition apparatus shown in FIG. 1 is an exemplary example in which the light source 110 and the sensor 151 are mounted on the same substrate 153 so that both the light source 110 and the sensor 151 can be supported by the substrate 153. In FIG. 1, the sensor 151 is illustrated to be protected by a housing such as the cover glass 152.

For a better understanding of this embodiment, the light path is represented by a type of a bar 24 depicted by a solid line or a dotted line in FIG. 2, and the light path is expressed as a dotted line in FIG. 3.

Figure 4:
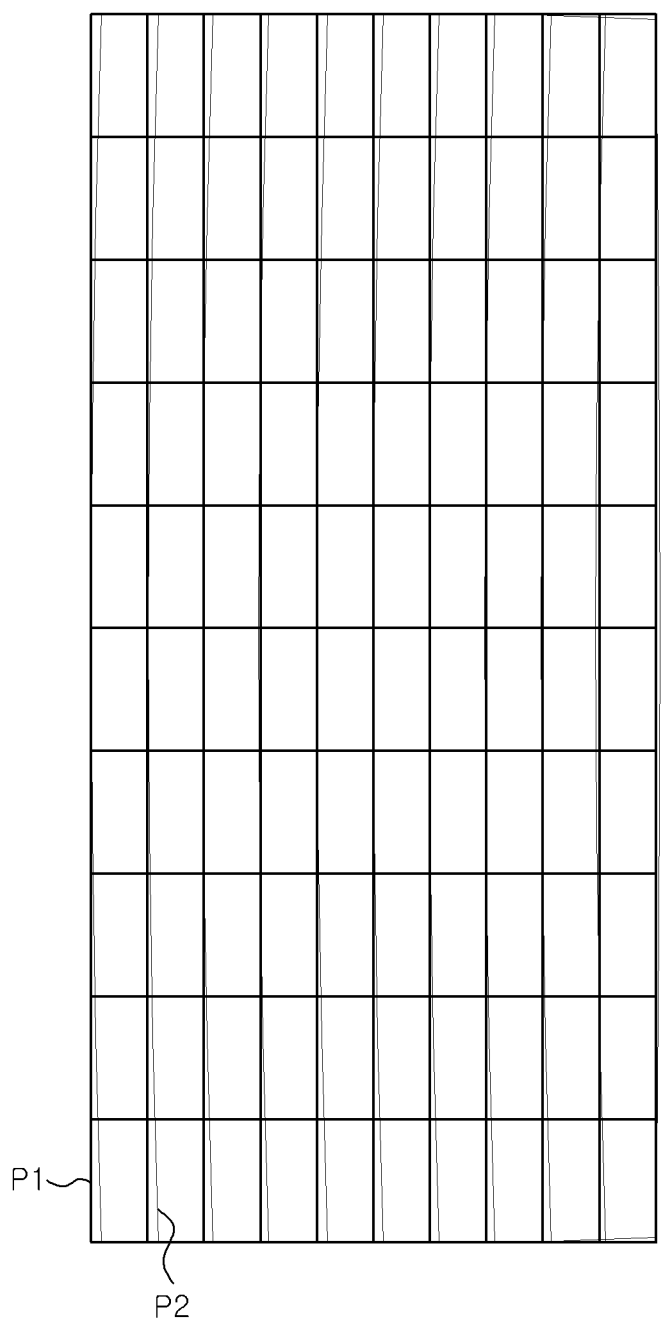
FIGS. 4 to 6 are views of distorted grids explaining the property of distortion improvement obtained by an optical fingerprint recognition apparatus in accordance with an embodiment of the present invention.
Figure 5:
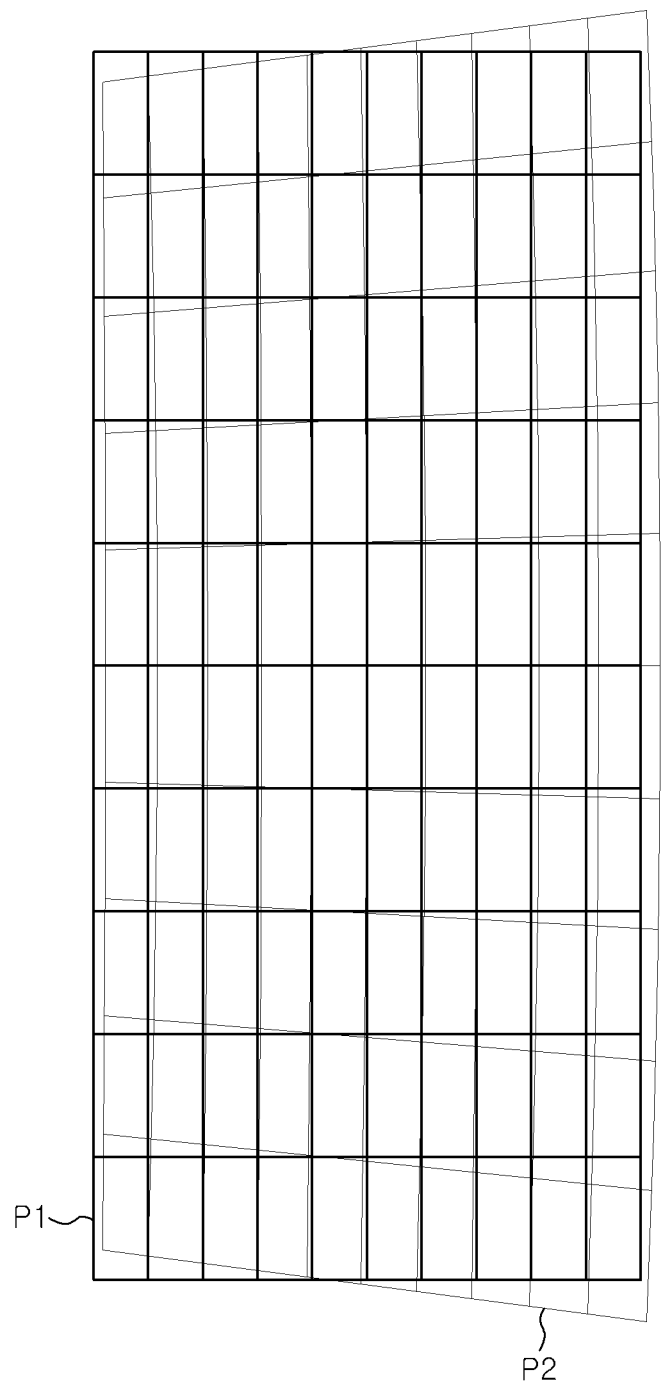
Figure 6:
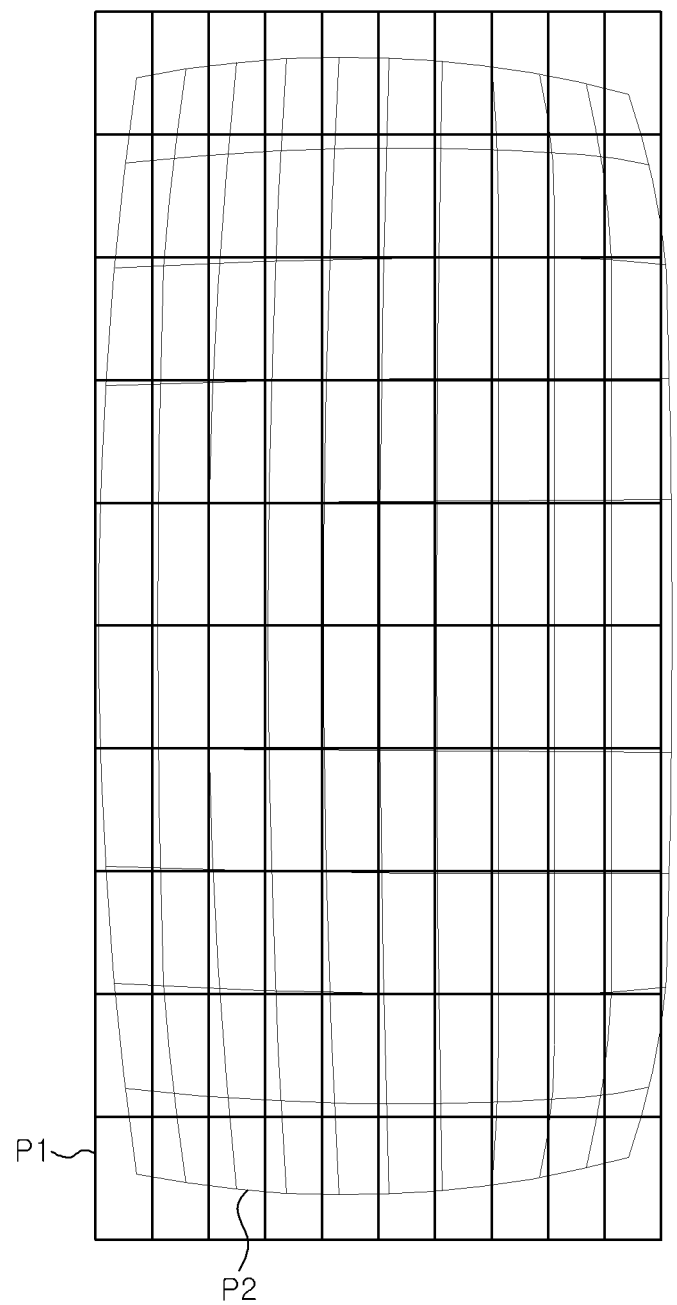

FIGS. 4 to 6 are views of distortion grids explaining the property of the distortion improvement achieved by the optical fingerprint recognition apparatus 100 in accordance with an embodiment of the present invention; and FIGS. 7 to 15 are MTF graphs on a field basis describing the property of performance improvement for MTF (Modulation Transfer Function) obtained by an optical fingerprint recognition apparatus in accordance with an embodiment of the present invention.

Hereinafter, the process of acquiring the fingerprint by the optical fingerprint recognition apparatus 100 will be described with reference to FIGS. 1 to 15.

First, light is generated by the light source 110 that is located at the bottom of the exterior of the prism 120 and is then incident on the upper surface 121 of the prism 120 by passing through the lower surface 122 of the prism 120.

When the object 10 having the fingerprint is in close contact with the fingerprint contact area on the upper surface 121, the points where the ridges of the fingerprint come in contact with the upper surface 121 cause the diffuse reflectance of the light impinging thereon, but the points where the valleys of the fingerprint come in contact with the upper surface 121 cause not the diffuse reflectance of the light impinging thereon. Accordingly, the light undergone the diffuse reflectance by the upper surface 121 of the prism 120 represents the characteristic of the fingerprint.

The light, which has undergone the diffuse reflectance by the upper surface 121 and represents the characteristic of the fingerprint, is incident on the lower surface 122 of the prism 120, is totally reflected from the lower surface 122, and is then incident on the first side surface 123 of the prism 120.

The first side surface 123 with the inclined surface then reflects the light to the condensing path 21, so that the light is incident on the mirror unit 130. The aforementioned first side surface 123 of the spherical shape serves to improve the image distortion such as a trapezoidal distortion generated by the off-axis optical system.

FIG. 4 shows distorted grids when the first side surface 123 of the prism 120 has a spherical shape, and FIG. 5 shows distorted grids when the first side surface 123 of the prism 120 has a flat form. In FIGS. 4 and 5, the pattern in which horizontal and vertical lines are directly perpendicular to each other is a basic pattern P1 and the other is an actually measured pattern P2. In comparison of FIG. 4 and FIG. 5, it can be seen that while FIG. 5 illustrates that the actually measured pattern P2 is shifted from the basic pattern P1, FIG. 4 illustrates that the actually measured pattern P2 is much similar to the basic pattern P1. This indicates that the trapezoidal distortion is significantly improved due to the first side surface 123 having a spherical shape.

Thereafter, the light reflected from the first side surface 123 of the prism 120 passes through the lens 124a of the second side surface 124 and is incident on the mirror unit 130. Here, the lens 124a of the second surface 124 plays a role to improve the MTF performance as well as to improve the image distortion such as the trapezoidal distortion generated in the off-axis optical system.

FIG. 6 shows distorted grids when the second side surface 124 of the prism 120 does not have the lens 124a. In FIG. 6, the pattern in which horizontal and vertical lines are directly perpendicular to each other is a basic pattern P1, and the other is an actually measured pattern P2. In comparison of FIG. 4 and FIG. 6, it can be seen that the basic pattern P1 and the actually measured pattern P2 are further shifted in FIG. 6 in comparison to FIG. 4. This indicates that the distortion is significantly improved by placing the lens 124a on the first side surface 123.

Figure 7:
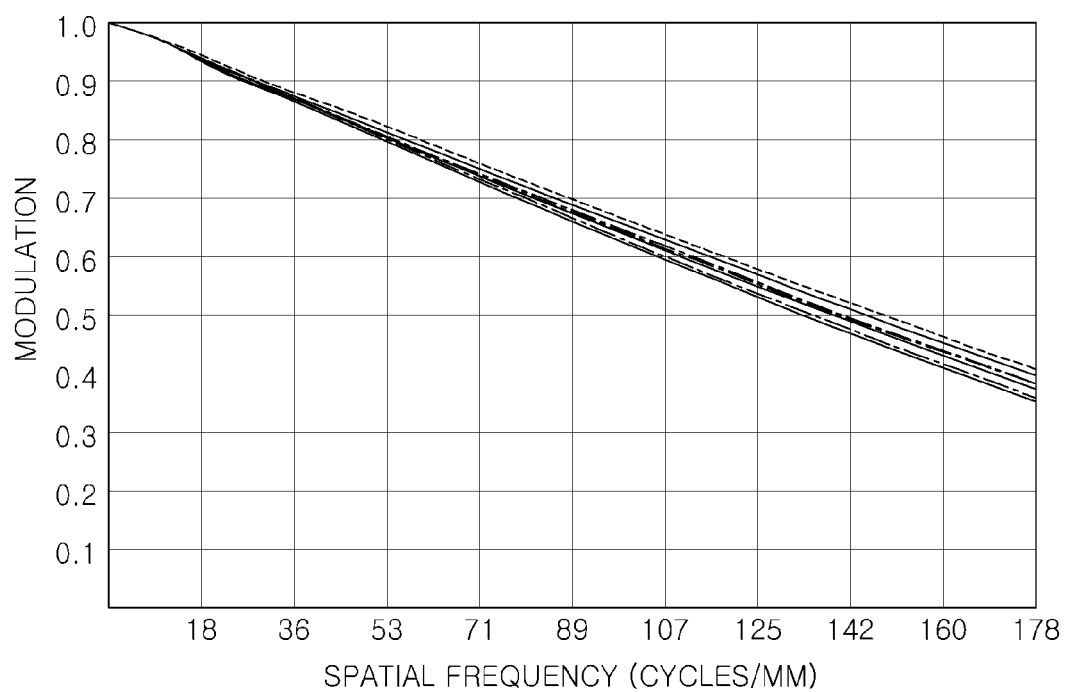
FIGS. 7 to 15 are MTF graphs on a field basis describing the property of performance improvement for MTF (Modulation Transfer Function) obtained by an optical fingerprint recognition apparatus in accordance with an embodiment of the present invention.
Figure 8:
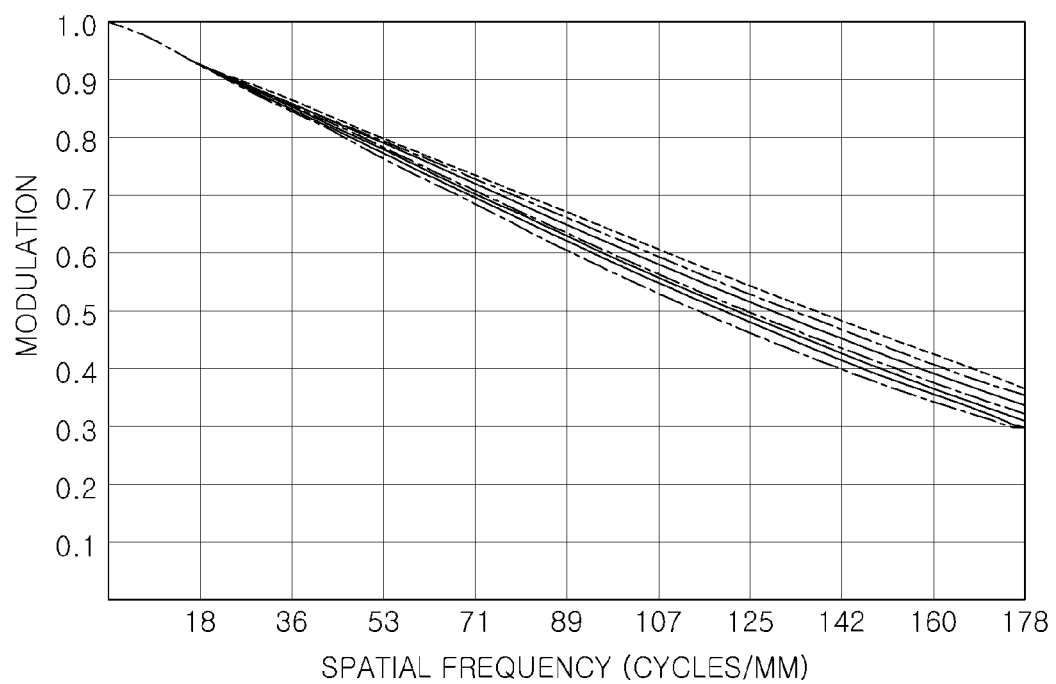
Figure 9:
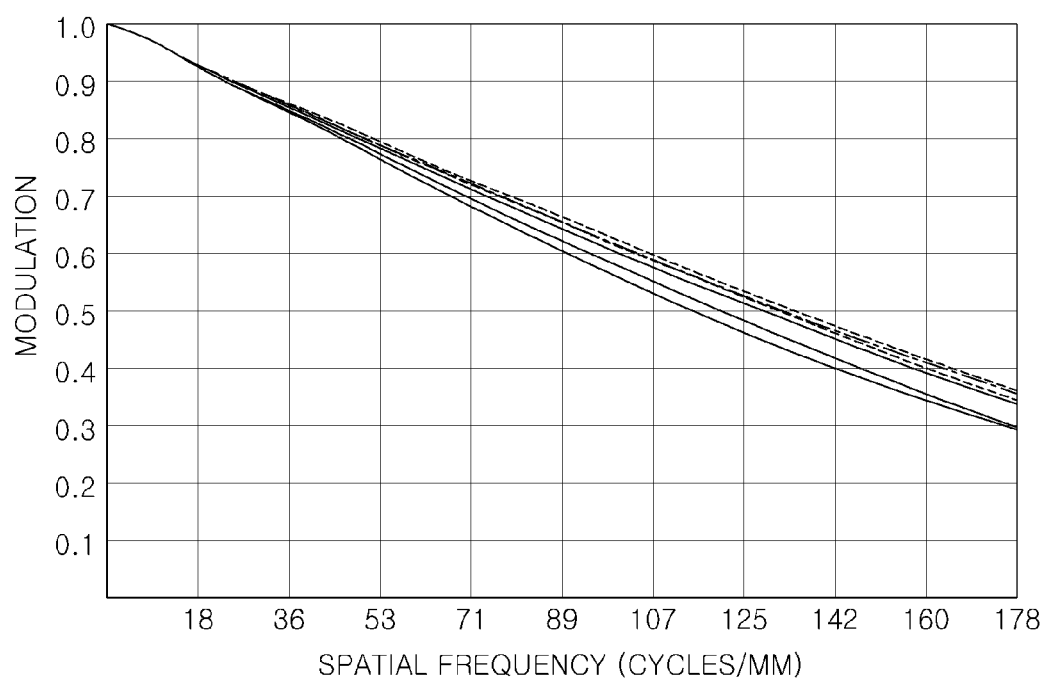
Figure 10:
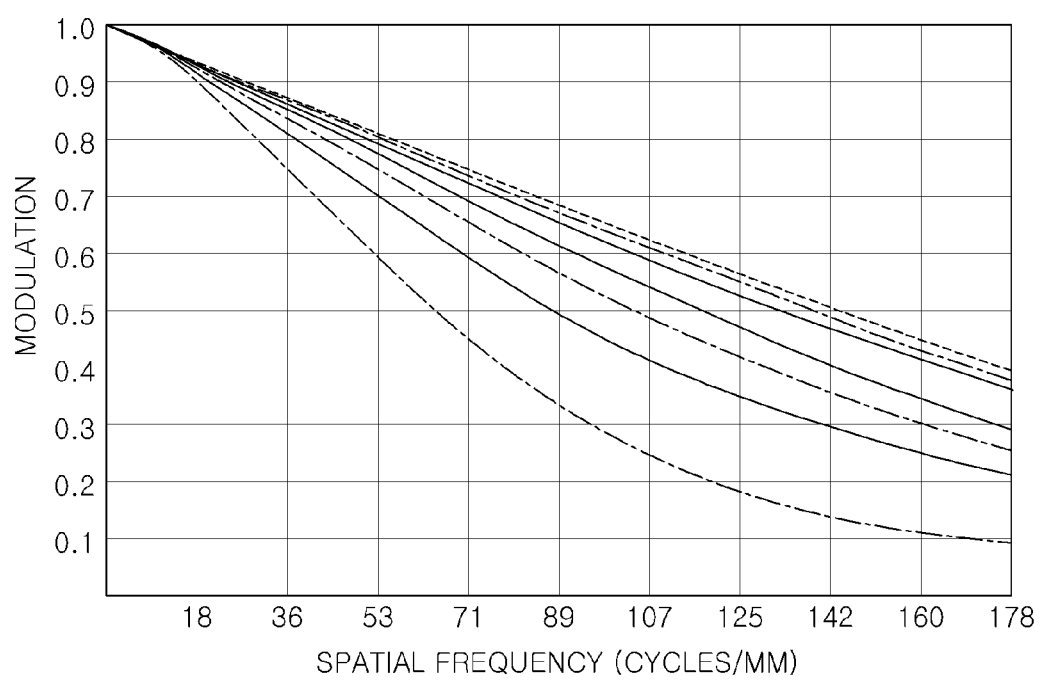
Figure 11:
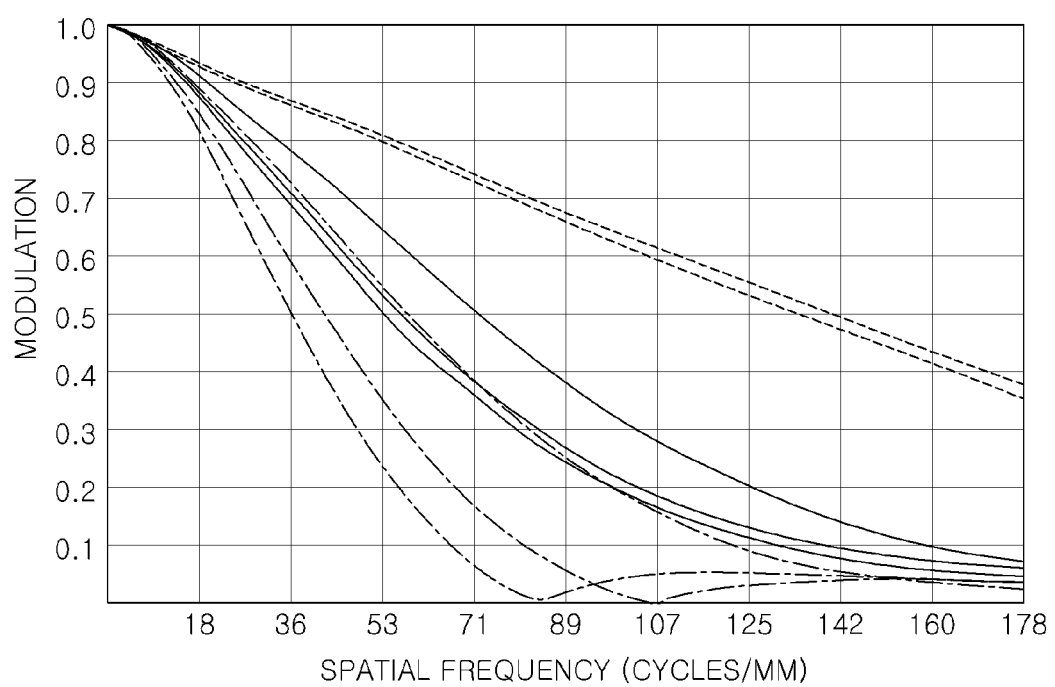
Figure 12:
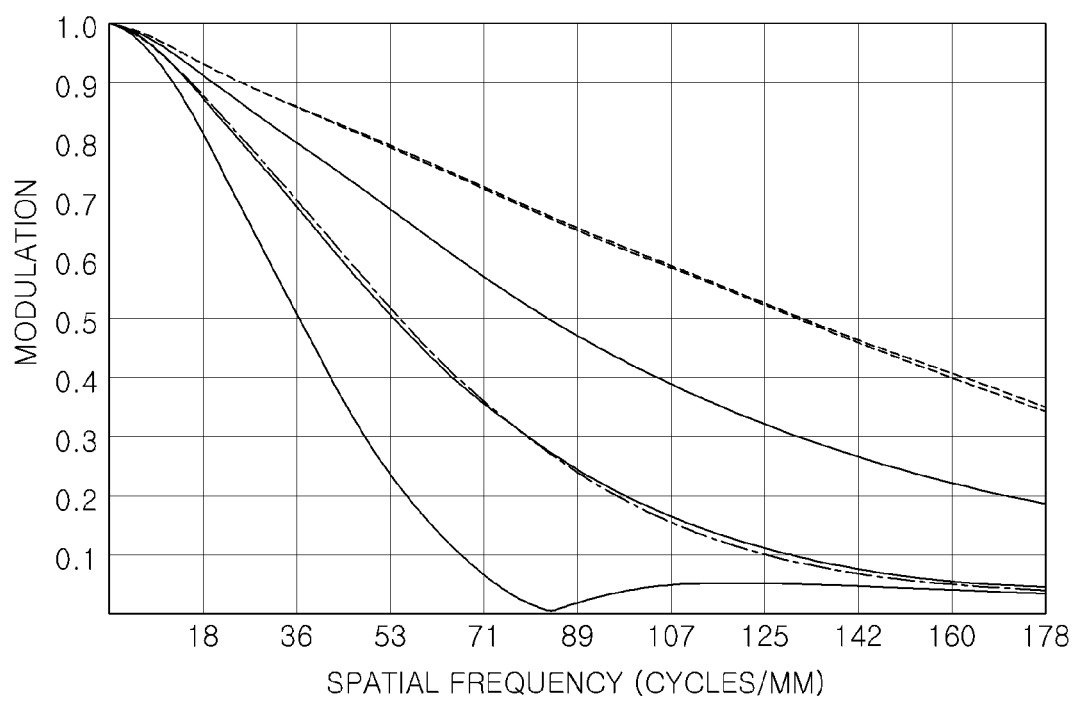

FIG. 7 to FIG. 9 are MTF (Modulation Transfer Function) charts on a field basis obtained by the optical fingerprint recognition apparatus 100 in accordance with an embodiment of the present invention, and FIG. 10 to FIG. 12 are MTF charts on a field basis obtained in the case of excepting the lens 124a of the second side surface 124 in the optical fingerprint recognition apparatus 100 in accordance with an embodiment of the present invention. In these MTF charts, the horizontal axis represents spatial frequency and the vertical axis represents modulation.

In FIGS. 7 to 9, dotted line is denotes diffraction limit performance. The MTF charts closer to the diffraction limit performance represent the performance improvement of MTF. In comparison of FIG. 7 and FIG. 10, it can be seen that MTF performance is improved at an inner field of in the fingerprint contact area due to the embodiment of the present invention. In comparison of FIG. 8 and FIG. 11, it can also be seen that MTF performance is improved at a middle field in the fingerprint contact area due to the embodiment of the present invention. Further, in comparison of FIG. 8 and FIG. 11, it can be seen that MTF performance is improved at an edge field in the fingerprint contact area by the embodiment of the present invention.

Next, after being emitted from the prism 120, the light is incident on the mirror unit 130 through the condensing path 21 and is then reflected to the imaging lens 22. The light, which represents the characteristic of the fingerprint of the object 10, is imaged on the sensor assembly 150 after passing through the convex lens 142a and the concave lens 142b arranged on the image forming path 22. As set forth above, each of the convex lens 142a and the concave lens 142b is arranged to have a de-centering amount with respect to the optical axis 23 and is also arranged to have a tilt angle θ with respect to the perpendicular axis 24 of the optical axis 23. As such, the arrangement in which the imaging lens including the convex lens 142a and the concave lens 142b has the de-centering amount and the tilt angle is aimed at improving the MTF performance.

Figure 13:
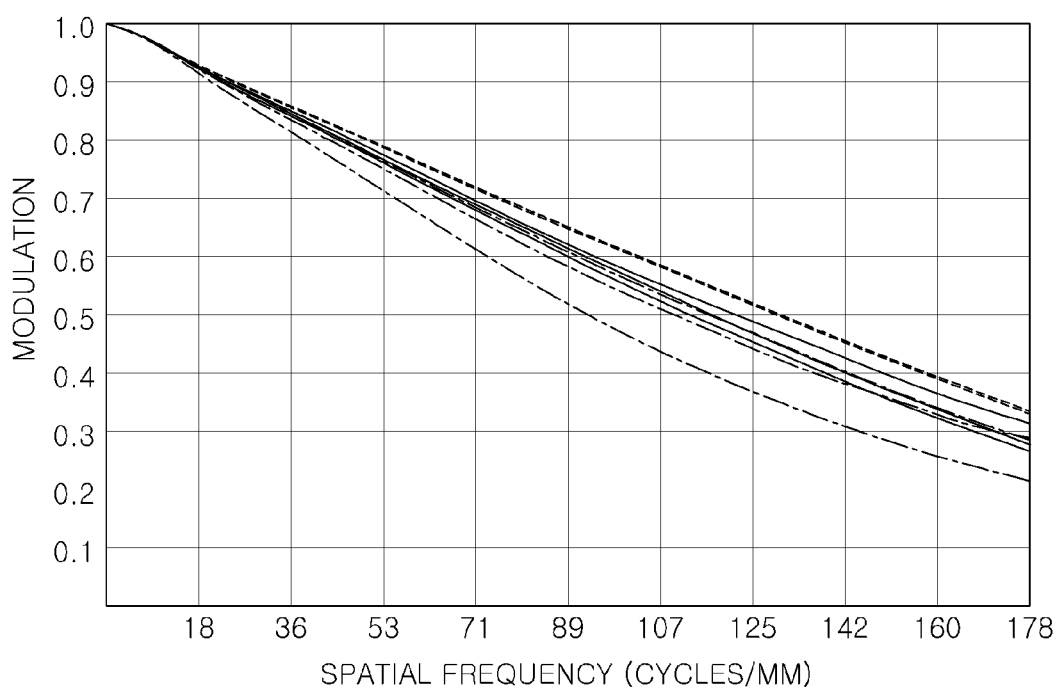
Figure 14:
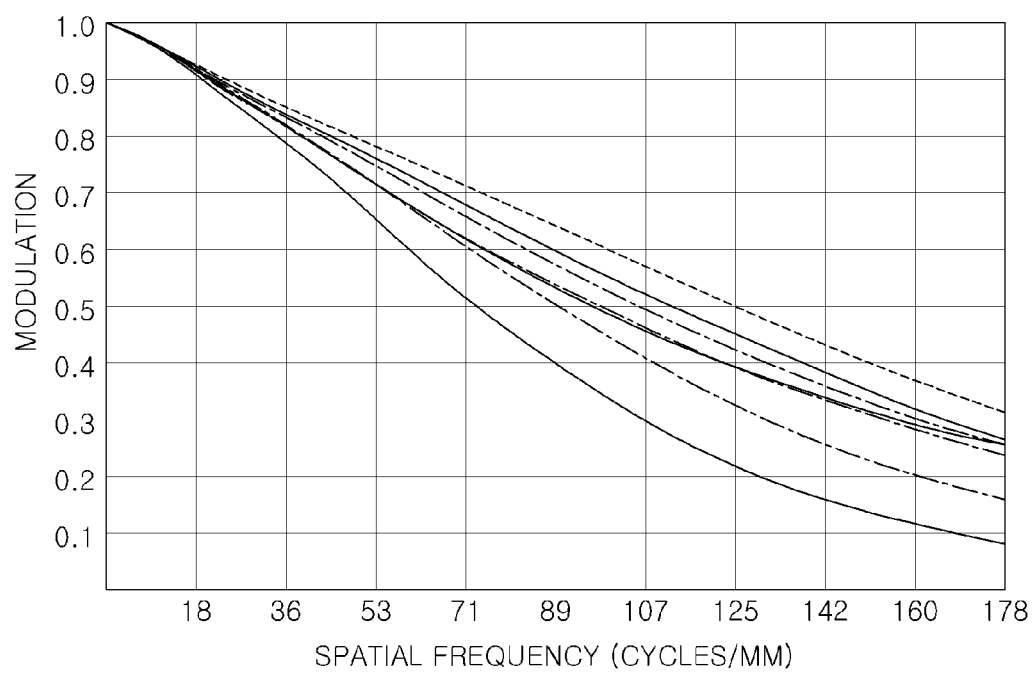
Figure 15:
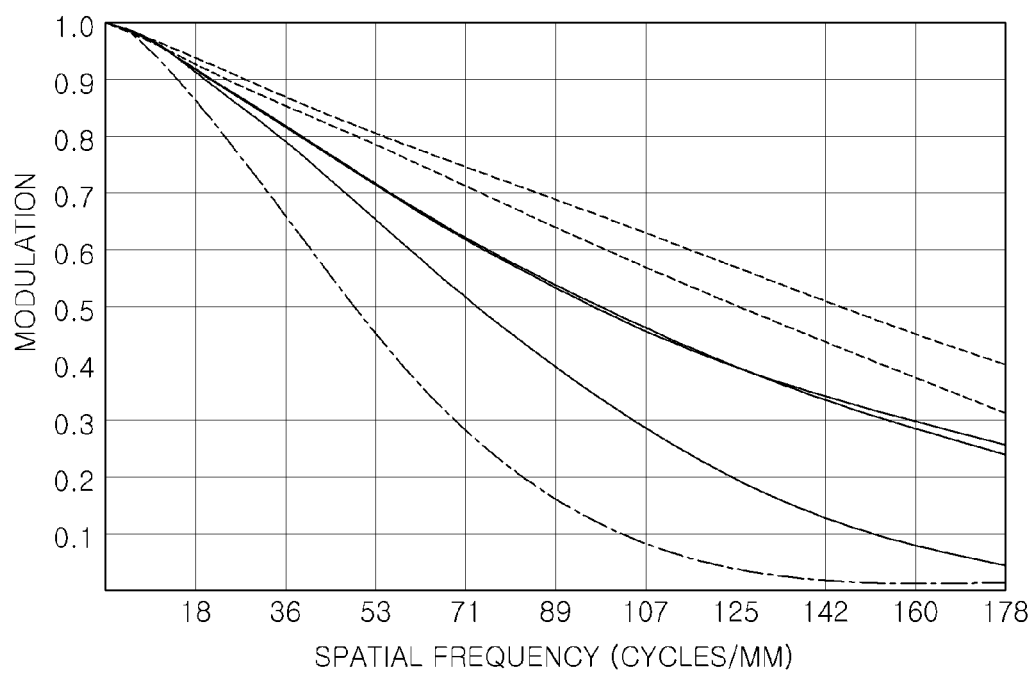

FIGS. 13 to 15 are MTM graphs on a field basis obtained in the case where the convex lens 142a and the concave lens 142b does not have the de-centering amount and the tilt angle in the optical fingerprint recognition apparatus 100. FIG. 14 shows a situation where the object 10 having the fingerprint comes in contact with a middle field in the fingerprint contact area on the upper surface 121; FIG. 13 shows a situation where the object 10 having the fingerprint comes in contact with an inner field in the fingerprint contact area on the upper surface 121; and FIG. 15 shows a situation where the object 10 having the fingerprint comes in contact with an edge middle field in the fingerprint contact area on the upper surface 121.

In FIGS. 13 to 15, dotted line is denotes diffraction limit performance. The MTF chart close to the diffraction limit performance represents the performance improvement of MTF. In comparison of FIG. 7 and FIG. 13, it can be seen that the performance improvement of MTF is achieved at an inner field of the fingerprint contact area by disposing the imaging lens 142 in accordance with the present invention. In comparison of FIG. 8 and FIG. 14, it can also be seen that the performance improvement of MTF is achieved at a middle field of the fingerprint contact area by disposing the imaging lens 142 in accordance with the embodiment of the present invention. Further, in comparison of FIG. 9 and FIG. 14, it can be seen that the performance improvement of MTF is achieved at an edge field of the fingerprint contact area by disposing the imaging lens 142 in accordance with the embodiment of the present invention.

Finally, the sensor assembly 150 converts the fingerprint image that is imaged by the imaging lens assembly 140 into an electrical signal and then outputs the converted electrical signal.

On the other hand, but for the absorbing film 124b, the light reflected by the second side surface 124 may be diffusely reflected by the upper surface 121 of the prism 120 and mixed with effective light at the sensor assembly 150 via the same or identical path. The absorbing film 124b formed on the second side surface 124 of the prism, therefore, serves to prevent the diffused reflection from occurring in the prism 120 by absorbing the light. As an example, the absorbing film 124b may be implemented by coating a black lacquer.

The explanation as set forth above is merely described a technical idea of the exemplary embodiments of the present invention, and it will be understood by those skilled in the art to which this invention belongs that various changes and modifications may be made without departing from the scope of the essential characteristics of the embodiments of the present invention. Therefore, the exemplary embodiments disclosed herein are not used to limit the technical idea of the present invention, but to explain the present invention, and the scope of the technical idea of the present invention is not limited to these embodiments. Therefore, the scope of protection of the present invention should be construed as defined in the following claims and changes, modifications and equivalents that fall within the technical idea of the present invention are intended to be embraced by the scope of the claims of the present invention.

What is claimed is:

1. An optical fingerprint recognition apparatus comprising:
    a prism configured to emit, through a condensing path, light that is incident from an external light source which is located at the bottom of the exterior of the prism;
    a mirror unit configured to reflect the light that is emitted from the prism to an image forming path;
    an imaging lens assembly configured to image the light reflected to the image forming path; and
    a sensor assembly configured to convert a fingerprint image formed by the image formation into an electrical signal, wherein the prism comprises:
    an upper surface configured to cause the light from the light source to undergo diffuse reflectance by a finger to be fingerprinted that comes in contact with the upper surface;
    a lower surface configured to totally reflect the light incident thereon, which undergoes the diffuse reflectance by the upper surface;
    a first side surface configured to reflect the light incident thereon, which is totally reflected from the lower surface, to the condensing path;
    a second side surface having a lens configured to condense the light incident thereon, which is reflected from the first side surface through the condensing path, to direct the light to the mirror unit,
    wherein the lower and upper surface are parallel and the first side surface has spherical shape, and
    wherein the imaging lens assembly comprises a first lens and a second lens that are arranged to have tilt angles with respect to a perpendicular axis of an optical axis of the image forming path and the tilt angles are different from each other.

2. The optical fingerprint recognition apparatus of claim 1, wherein the imaging lens assembly comprises an imaging lens arranged on the image forming path, and the imaging lens is arranged to have a de-centering amount with respect to the optical axis.

3. The optical fingerprint recognition apparatus of claim 1, wherein the imaging lens assembly comprises an imaging lens arranged on the image forming path, and the imaging lens is arranged to have a tilt angle with respect to a perpendicular axis of an optical axis.

4. The optical fingerprint recognition apparatus of claim 3, wherein the imaging lens comprises a convex lens and a concave lens that are arranged to have tilt angles different from each other.

5. The optical fingerprint recognition apparatus of claim 1, wherein the light incident on the lower surface has an incident angle that meets the condition for the total reflection.

6. The optical fingerprint recognition apparatus of claim 1, wherein the first side surface of the prism has a spherical shape.

7. The optical fingerprint recognition apparatus of claim 1, wherein the first side surface of the prism has an inclined surface, the inclined surface having an angle such that the light incident on the first side surface, which is reflected from the lower surface, is reflected to the condensing path.

8. The optical fingerprint recognition apparatus of claim 1, wherein the second side surface has an absorbing file formed thereon, the absorbing film serving to prevent diffused reflection by absorbing the light.

9. The optical fingerprint recognition apparatus of claim 8, wherein the second side surface has a chamfered edge and is covered with the absorbing film in an area excepting the lens.

* * * * *